(12) United States Patent
Kawamura

(10) Patent No.: US 11,523,064 B2
(45) Date of Patent: Dec. 6, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takuya Kawamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/229,683

(22) Filed: Apr. 13, 2021

(65) Prior Publication Data

US 2021/0329156 A1  Oct. 21, 2021

(30) Foreign Application Priority Data

Apr. 15, 2020  (JP) .............................. JP2020-072924

(51) Int. Cl.
*H04N 5/235* (2006.01)
*G06T 5/00* (2006.01)
*H04N 5/232* (2006.01)

(52) U.S. Cl.
CPC ........... *H04N 5/2351* (2013.01); *G06T 5/008* (2013.01); *H04N 5/2355* (2013.01); *H04N 5/23245* (2013.01)

(58) Field of Classification Search
CPC ............. H04N 5/2351; H04N 5/23245; H04N 5/2355; G06T 5/008
See application file for complete search history.

(56) References Cited

U.S. PATENT DOCUMENTS

| 9,936,141 B2* | 4/2018 | Kitajima .............. H04N 5/2621 |
| 10,057,503 B2* | 8/2018 | Suzuki ................ H04N 5/2351 |
| 2019/0260921 A1 | 8/2019 | Naoko |

FOREIGN PATENT DOCUMENTS

| EP | 1883052 A2 | 1/2008 |
| JP | 2010135996 A | 6/2010 |

* cited by examiner

*Primary Examiner* — Ahmed A Berhan
(74) *Attorney, Agent, or Firm* — Canon U.S.A., Inc. IP Division

(57) ABSTRACT

An image processing apparatus comprises a processing unit configured to provide an image containing a first object and a second object, with a lighting effect from a virtual light source, a setting unit configured to set a parameter of the virtual light source; and a designating unit configured to designate the first object and/or the second object, based on a user's operation, wherein, in a case in which the designating unit has designated at least one of the first object and the second object, the first object and the second object are provided with an effect of virtual light from a same direction, and in a case in which the designating means has not designated any object, the first object and the second object are provided with an effect of virtual light from different directions.

15 Claims, 7 Drawing Sheets

BEFORE RE-LIGHTING
PROCESSING

AFTER RE-LIGHTING
PROCESSING

VIRTUAL LIGHT SOURCE

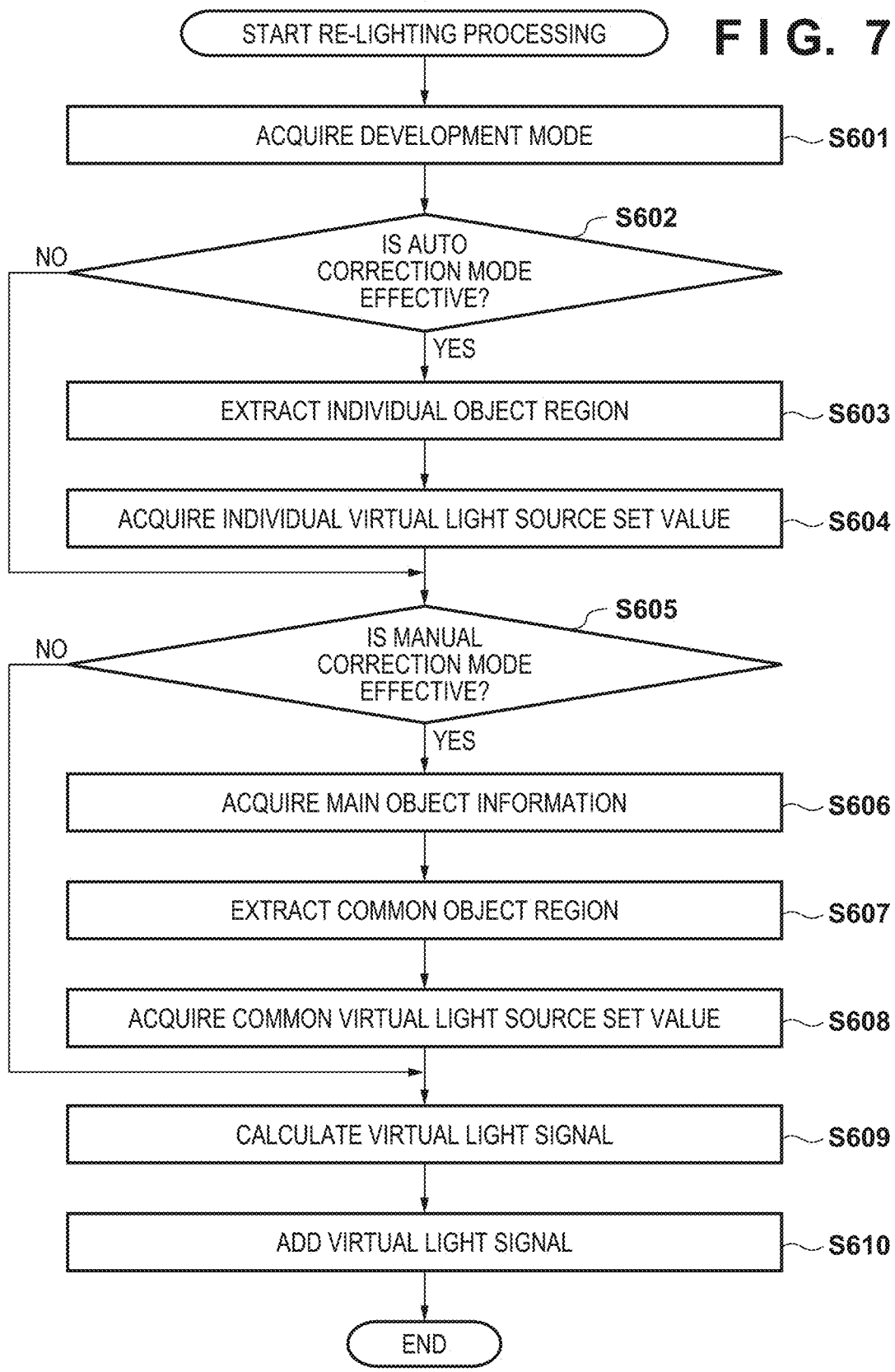

IMAGE PROCESSING APPARATUS, IMAGE PROCESSING METHOD, AND STORAGE MEDIUM

BACKGROUND OF THE INVENTION

Field of the Invention

The present invention relates to a technique for correcting the brightness of an image through image processing.

Description of the Related Art

Conventionally, there are known techniques for correcting the brightness of a dark portion of an object in an image, by applying the effect of virtual light to the object (Japanese Patent Laid-Open No. 2010-135996). Accordingly, it is possible to adjust shadows of an object cast by environmental light after capturing the image.

However, according to the conventional technique disclosed in Japanese Patent Laid-Open No. 2010-135996 above, when an image of a plurality of objects is captured and corrected with a virtual light source determined according to shadows for each object, how the objects are irradiated with light from the virtual light sources may be unnatural. On the other hand, when a plurality of objects are corrected through irradiation with light from a virtual light source determined based on shadows of a specific object, how the objects are irradiated with light from the virtual light source may be natural, but it may be difficult to appropriately correct each object. Accordingly, when there are a plurality of objects, a desired lighting effect may not be achieved.

SUMMARY OF THE INVENTION

The present invention was made in view of the above-described problems, and provides an image processing apparatus capable of effectively correcting shadows even when there are a plurality of objects.

According to a first aspect of the present invention, there is provided an image processing apparatus comprising: at least one processor or circuit configured to function as a processing unit configured to provide an image containing a first object and a second object, with a lighting effect from a virtual light source; a setting unit configured to set a parameter of the virtual light source; and a designating unit configured to designate the first object and/or the second object, as a target of the processing unit, based on a user's operation, wherein, in a case in which the designating unit has designated at least one of the first object and the second object, the first object and the second object are provided with an effect of virtual light from a same direction, and in a case in which the designating means has not designated any object, the first object and the second object are provided with an effect of virtual light from different directions.

According to a second aspect of the present invention, there is provided an image processing method comprising: providing an image containing a first object and a second object, with a lighting effect from a virtual light source; setting a parameter of the virtual light source; and performing a selection process, in which the first object and/or the second object may be designated, as a target of the processing, based on a user's operation, wherein, in a case in which at least one of the first object and the second object has been designated in the selection process, the first object and the second object are provided with an effect of virtual light from a same direction, and in a case in which no object has been designated in the designating, the first object and the second object are provided with an effect of virtual light from different directions.

According to a third aspect of the present invention, there is provided an image processing apparatus comprising: at least one processor or circuit configured to function as a processing unit configured to provide a plurality of objects in an image, with a lighting effect from a virtual light source; a setting unit configured to set a parameter of the virtual light source; and a designating unit configured to designate any of the plurality of objects, as a target of the processing unit, based on a user's operation, wherein, in a case in which the designating unit has designated any object, the setting means sets a parameter of the virtual light source for an object that is not designated by the designating unit, based on a parameter of the virtual light source for the designated object, and in a case in which the designating unit has not designated any object, the setting unit sets a parameter of the virtual light source for each of the plurality of objects, based on information regarding the object.

According to a fourth aspect of the present invention, there is provided an image processing method comprising: providing a plurality of objects in an image, with a lighting effect from a virtual light source; setting a parameter of the virtual light source; and performing a selection process, in which any of the plurality of objects may be designated, as a target of the processing, based on a user's operation, wherein, in a case in which any object has been designated in the designating, a parameter of the virtual light source is set in the setting for an object that is not designated in the designating, based on a parameter of the virtual light source for the designated object, and in a case in which no object has been designated in the designating, a parameter of the virtual light source is set in the setting for each of the plurality of objects, based on information regarding the object.

Further features of the present invention will become apparent from the following description of exemplary embodiments with reference to the attached drawings.

BRIEF DESCRIPTION OF THE DRAWINGS

FIG. 7 is a flowchart illustrating re-lighting processing in the embodiment.

DESCRIPTION OF THE EMBODIMENTS

Figure 1:
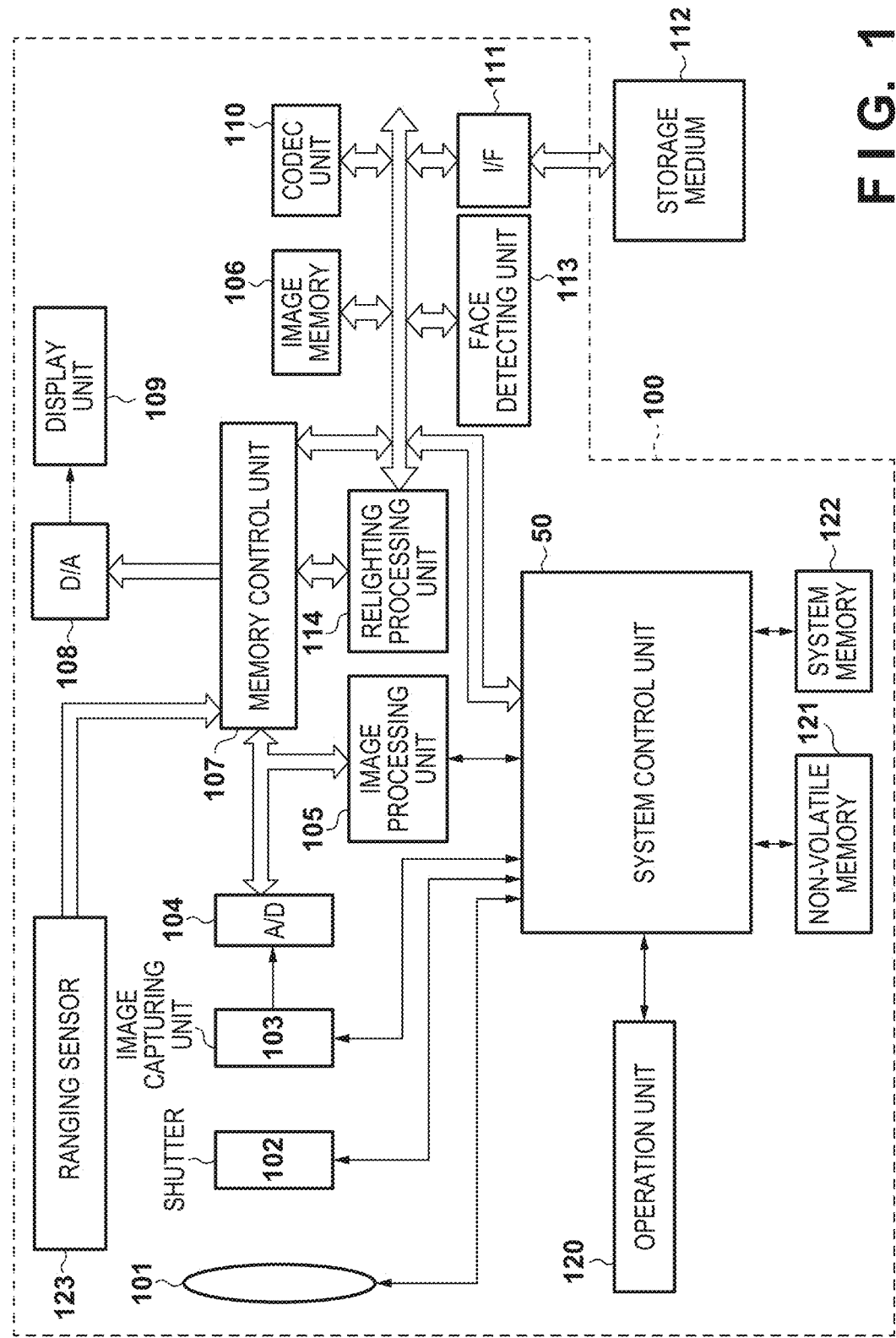
FIG. 1 is a block diagram showing the configuration of digital camera that is an embodiment of an image processing apparatus of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

FIG. 1 is a block diagram showing the configuration of a digital camera 100 that is an embodiment of an image processing apparatus of the present invention.

In the digital camera 100 shown in FIG. 1, incident light transmitted via a lens group 101 (imaging optical system) including a zoom lens and a focus lens and a shutter 102 having the diaphragm function is subjected to photoelectric conversion in an image capturing unit 103. The image capturing unit 103 includes an image sensor such as a CCD or CMOS sensor, and an electrical signal obtained through the photoelectric conversion is output as an image signal to an A/D converter 104. The A/D converter 104 converts an analog image signal output from the image capturing unit 103 into a digital image signal (image data), and outputs it to an image processing unit 105.

The image processing unit 105 performs various types of image processing such as color conversion processing (e.g., white balance), γ processing, edge enhancement processing, and color correction processing, on the image data from the A/D converter 104 or image data read from the image memory 106 by means of a memory control unit 107. The image data output from the image processing unit 105 is written to the image memory 106 by means of a memory control unit 107. The image memory 106 stores the image data output from the image processing unit 105 and image data that is to be displayed on a display unit 109.

A face detecting unit 113 detects face and facial organ regions containing faces and facial organs of people, from a captured image. The image processing unit 105 performs predetermined evaluation value calculation processing using a face detection result or a facial organ detection result from the face detecting unit 113 and captured image data, and a system control unit 50 performs exposure control and focus control based on the obtained evaluation value. Accordingly, AF (auto focus) processing, AE (auto exposure) processing, AWB (auto white balance) processing, and the like according to a TTL (through-the-lens) method are executed.

Furthermore, a D/A converter 108 converts digital image data for display, stored in the image memory 106, into an analog signal, and supplies it to the display unit 109. The display unit 109 performs display according to the analog signal from the D/A converter 108, on a display unit such as an LCD.

A codec unit 110 compresses and encodes the image data stored in the image memory 106, according to the standard such as JPEG or MPEG. The system control unit 50 stores the encoded image data via an interface (I/F) 111 in a storage medium 112 such as a memory card or a hard disk. Furthermore, image data read from the storage medium 112 via the I/F 111 is decoded and decompressed by the codec unit 110, and is stored in the image memory 106. When the image data stored in the image memory 106 is displayed on the display unit 109 by means of a memory control unit 107 and the D/A converter 108, the image is reproduced and displayed.

The re-lighting processing unit 114 performs re-lighting processing that irradiates a captured image with light from a virtual light source, thereby correcting the brightness. The re-lighting processing that is performed by the re-lighting processing unit 114 will be described later in detail.

The system control unit 50 controls the entire system of the digital camera 100. The non-volatile memory 121 is constituted by a memory such as an EEPROM, and stores programs, parameters, and the like necessary for the processing of the system control unit 50. The system control unit 50 develops and executes the programs stored in the non-volatile memory 121 and constants and variables for the operation of the system control unit 50, in a system memory 122, thereby realizing the processing of embodiments described later.

An operation unit 120 accepts operations such as menu setting or image selection by a user. A ranging sensor 123 measures the distance to an object, and outputs distance information corresponding to each pixel of imaging pixels.

Figure 2:
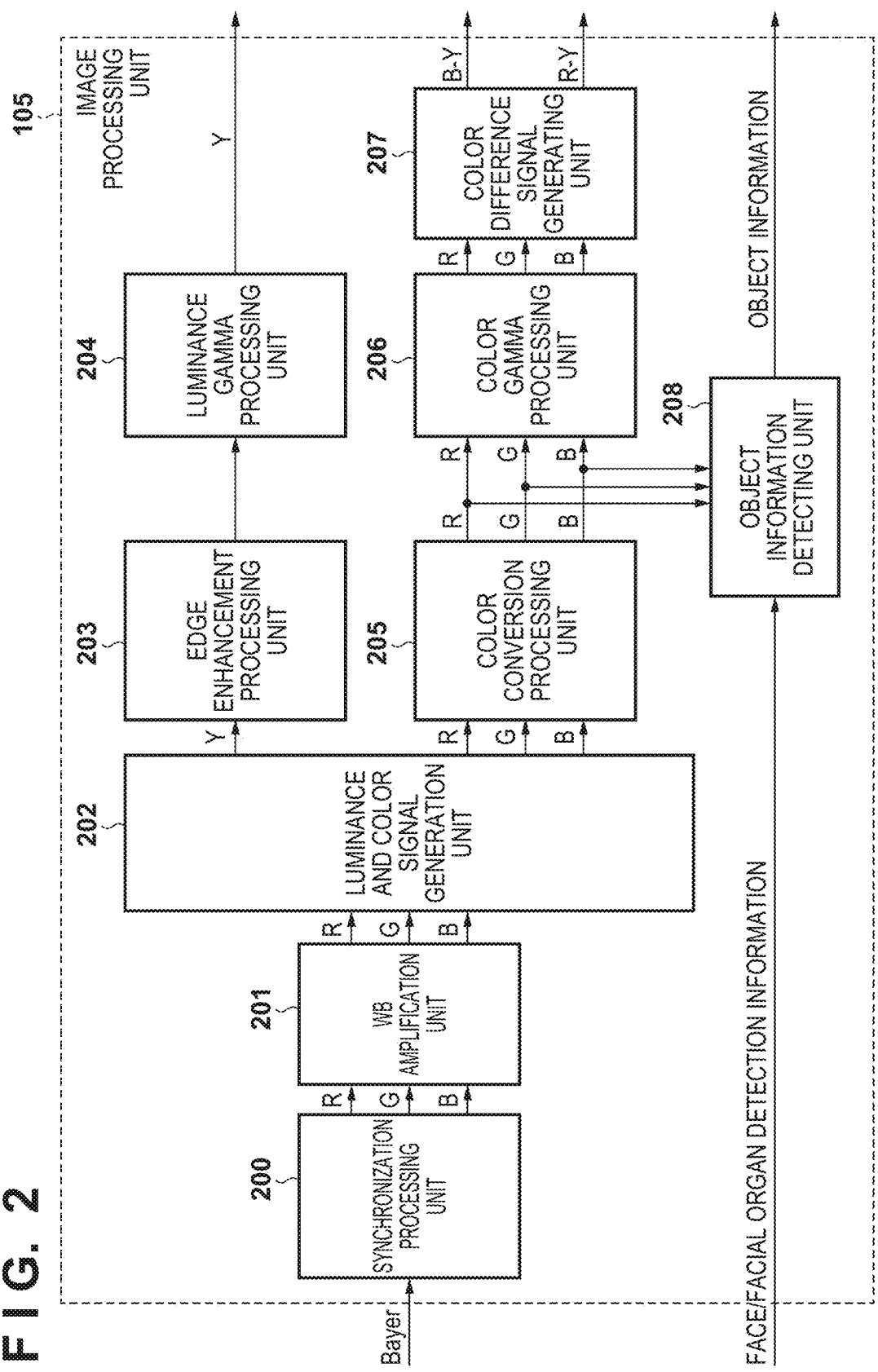
FIG. 2 is a block diagram showing the configuration of an image processing unit in the embodiment.

Next, the image processing unit 105 will be described in detail with reference to FIG. 2. FIG. 2 is a block diagram showing the configuration of the image processing unit 105. In this embodiment, it is assumed that the image sensor of the image capturing unit 103 is covered by a color filter of Bayer arrangement. Accordingly, an R, G, or B image signal is output from each pixel of the image sensor of the image capturing unit 103.

First, Bayer RGB image data input from the A/D converter 104 shown in FIG. 1 is input to a synchronization processing unit 200. The synchronization processing unit 200 performs synchronization processing on the input R, G, and B image signals, thereby generating color signals RGB for each pixel. A WB amplification unit 201 applies a gain to the generated color signals RGB of each pixel, based on a white balance gain value calculated by the system control unit 50 through known processing, thereby adjusting the white balance. The color signals RGB whose white balance was adjusted by the WB amplification unit 201 are input to a luminance and color signal generating unit 202. The luminance and color signal generating unit 202 generates a luminance signal Y from the color signals RGB, and outputs the generated luminance signal Y to an edge enhancement processing unit 203 and outputs the color signals RGB to a color conversion processing unit 205.

The edge enhancement processing unit 203 performs edge enhancement processing on the luminance signal Y, and outputs the resultant signal to a luminance gamma processing unit 204. The color conversion processing unit 205 performs, for example, matrix computation on the color signals RGB, thereby performing conversion to achieve a desired color balance, and outputs the resultant signals to a color gamma processing unit 206 and an object information detecting unit 208.

The object information detecting unit 208 detects information regarding objects in a captured image, from face/facial organ detection information output from the face detecting unit 113 and the color signals RGB output from the color conversion processing unit 205. The information regarding objects is the number of objects in a captured image, the sizes of the objects, the positions of the objects, how the objects are irradiated with light, shadow information of the objects, and the like. For example, the number, sizes, and positions of objects are detected from coordinate position information of each face/facial organ output by the face detecting unit 113, and how the objects are irradiated with light and shadow information are detected from average luminance information and luminance histogram information of the entire captured image and each object.

The luminance gamma processing unit 204 performs gamma correction on the luminance signal Y, and outputs the luminance signal Y subjected to the gamma correction to the image memory 106 by means of a memory control unit 107.

Meanwhile, the color gamma processing unit 206 performs gamma correction on the color signals RGB, and outputs the resultant signals to a chrominance signal generating unit 207. The chrominance signal generating unit 207 generates chrominance signals R-Y and B-Y from the RGB signals, and outputs them to the image memory 106 by means of a memory control unit 107.

Figure 3:
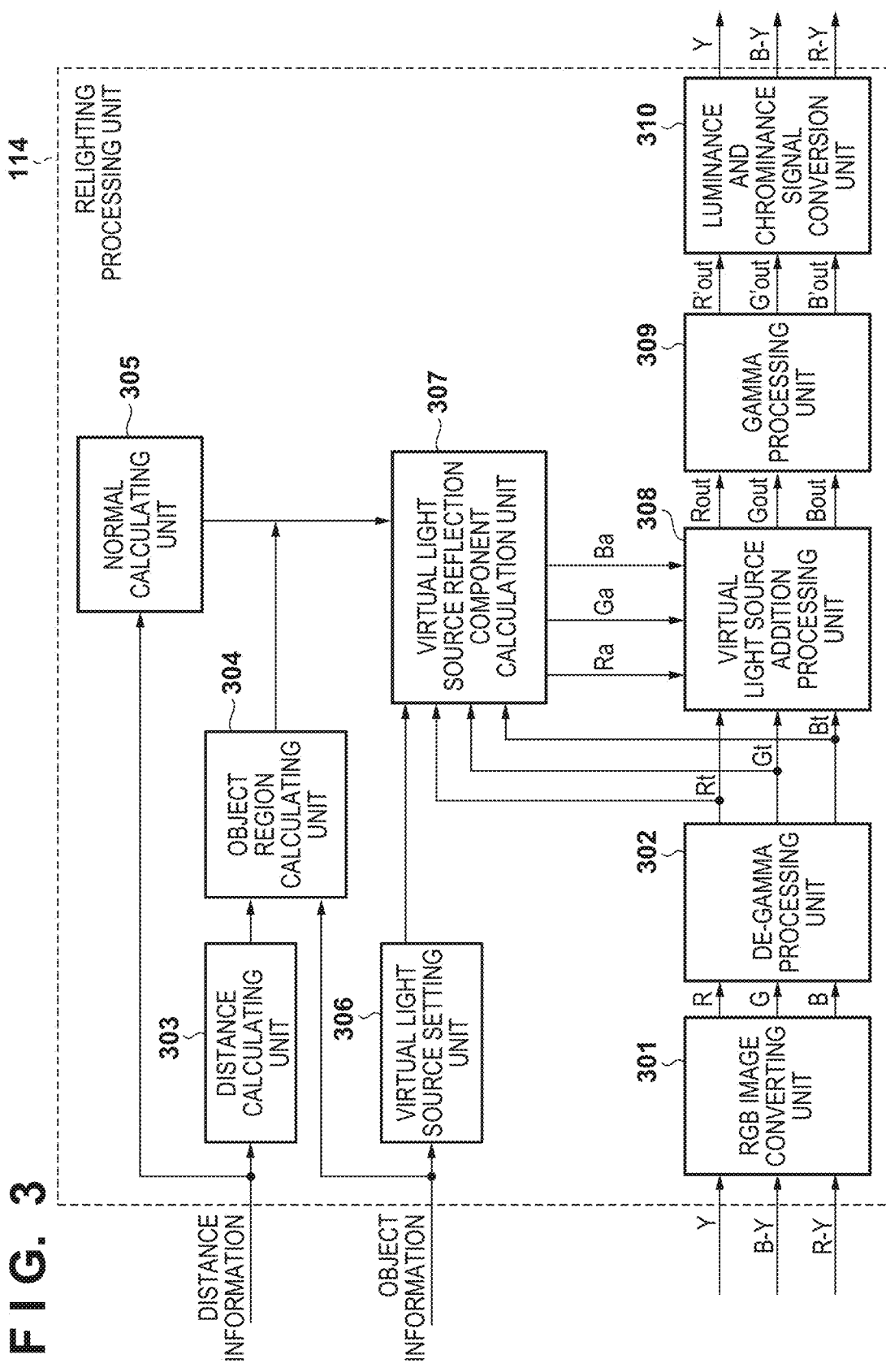
FIG. 3 is a block diagram showing the configuration of a re-lighting processing unit in the embodiment.

Next, the re-lighting processing in this embodiment will be described. FIG. 3 is a block diagram showing the configuration of the re-lighting processing unit 114.

The re-lighting processing unit 114 reads the luminance signal Y and the chrominance signals B-Y and R-Y processed by the image processing unit 105 and stored in the image memory 106, and performs, using the signals as input, re-lighting processing with a virtual light source.

First, an RGB signal converting unit 301 converts the input luminance signal Y and chrominance signals B-Y and R-Y into RGB signals, and outputs the resultant signals to a de-gamma processing unit 302. The de-gamma processing unit 302 performs an operation (de-gamma processing) that is inverse to the gamma characteristics of the gamma correction by the luminance gamma processing unit 204 and the color gamma processing unit 206 of the image processing unit 105, thereby converting the signals into linear data. The de-gamma processing unit 302 outputs the RGB signals (Rt, Gt, Bt) that have been converted into linear data, to a virtual light source reflection component calculating unit 307 and a virtual light source addition processing unit 308.

Meanwhile, a distance calculating unit 303 calculates a distance map from object distance information acquired from the ranging sensor 123. The object distance information is two-dimensional distance information obtained at the pixel level of a captured image. The object region calculating unit 304 calculates an object region, using, as input, object information indicating the number, positions, sizes of faces, contrasts, shadow information and the like of objects in a captured image input from the object information detecting unit 208 of the image processing unit 105, and distance map input from the distance calculating unit 303, and outputs an object region map. The object region map indicates whether or not each pixel of a captured image contains an object, and the calculation method will be described later in detail. A normal calculating unit 305 calculates a normal map, as shape information indicating the shape of an object, from the distance map calculated by the distance calculating unit 303. It is assumed that a known technique is used as a method for generating a normal map from a distance map, but a specific processing example thereof will be described with reference to FIG. 4.

Figure 4:
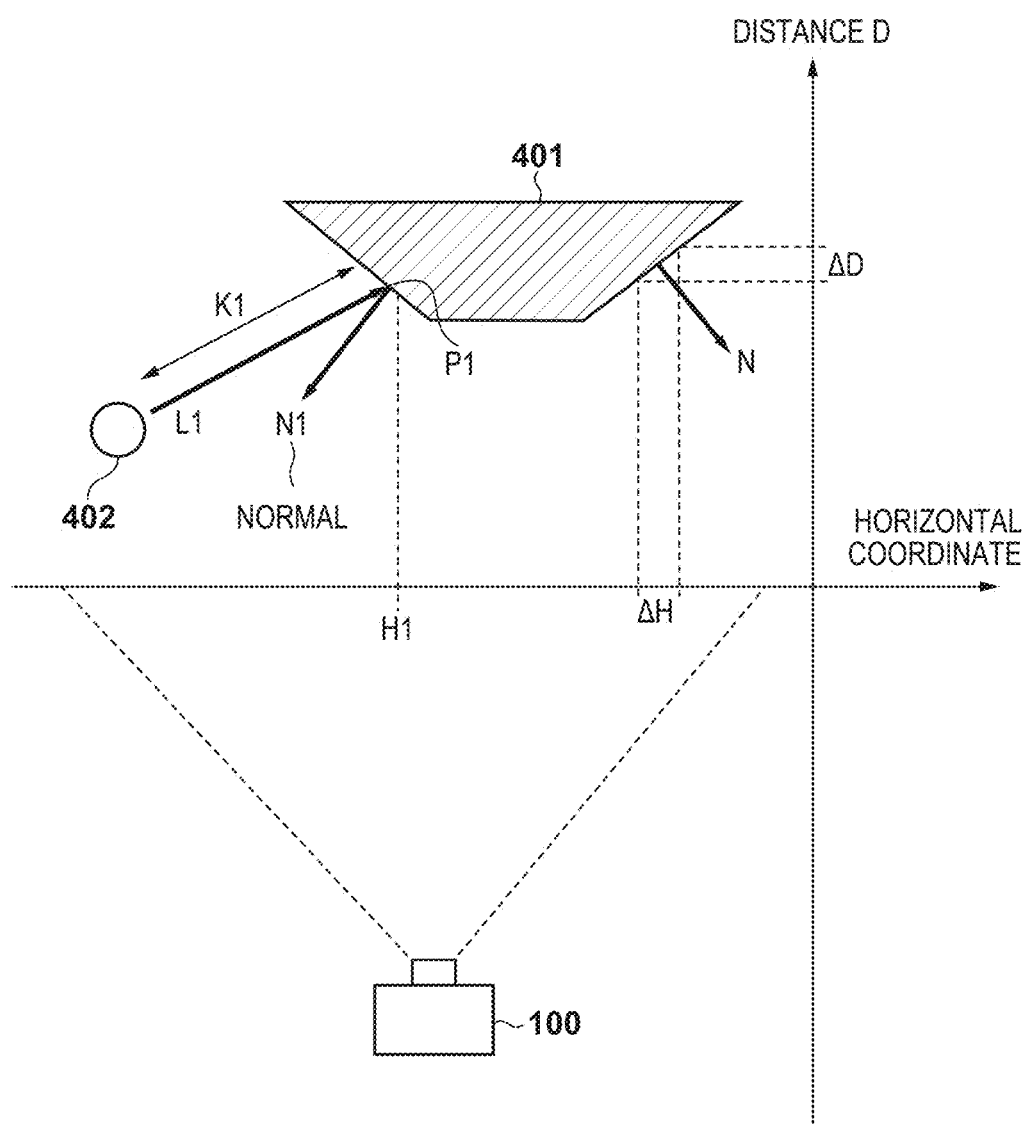
FIG. 4 is a schematic diagram illustrating reflection of virtual light from a virtual light source in the embodiment.

FIG. 4 is a diagram illustrating a relationship between the camera imaging coordinates and an object. For example, as shown in FIG. 4, gradient information of part of an object 401 is calculated from a difference ΔDH in a distance D relative to a difference ΔH in the horizontal direction of a captured image and a difference ΔDV in the distance D relative to a difference ΔV in an unshown vertical direction (a direction that is vertical to the section of the diagram of FIGS. 5A and 5B). A normal N can be calculated from the obtained gradient information of part of the object. The normal N corresponding to each pixel of the captured image can be calculated by performing the above-described processing on the pixel of the captured image. The normal calculating unit 305 outputs information on the normal N corresponding to each pixel of the captured image, as a normal map, to the virtual light source reflection component calculating unit 307.

Although it was described that the distance calculating unit 303 and the normal calculating unit 305 are provided in the re-lighting processing unit 114, the present invention is not limited to this, and it is also possible that, for example, they are provided in the ranging sensor 123 or the image processing unit 105, or provided independently.

A virtual light source setting unit 306 sets a parameter of the virtual light source, based on object information input from the object information detecting unit 208 of the image processing unit 105. For example, if it is intended to overall increase the brightness of a face of an object whose whole face is dark, parameters such as a position, an irradiation range, and an intensity of a virtual light source are controlled such that the whole face is included in the irradiation range of the virtual light source. It is assumed that the virtual light source includes at least one of additive light that increases the brightness of an object, subtractive light that decreases the brightness of an object, and mirror-reflective light that adds mirror reflection to an object.

Hereinafter, parameters that are set for a virtual light source will be described with reference to FIGS. 5A and 5B assuming that the number of objects is one.

Figure 5A:
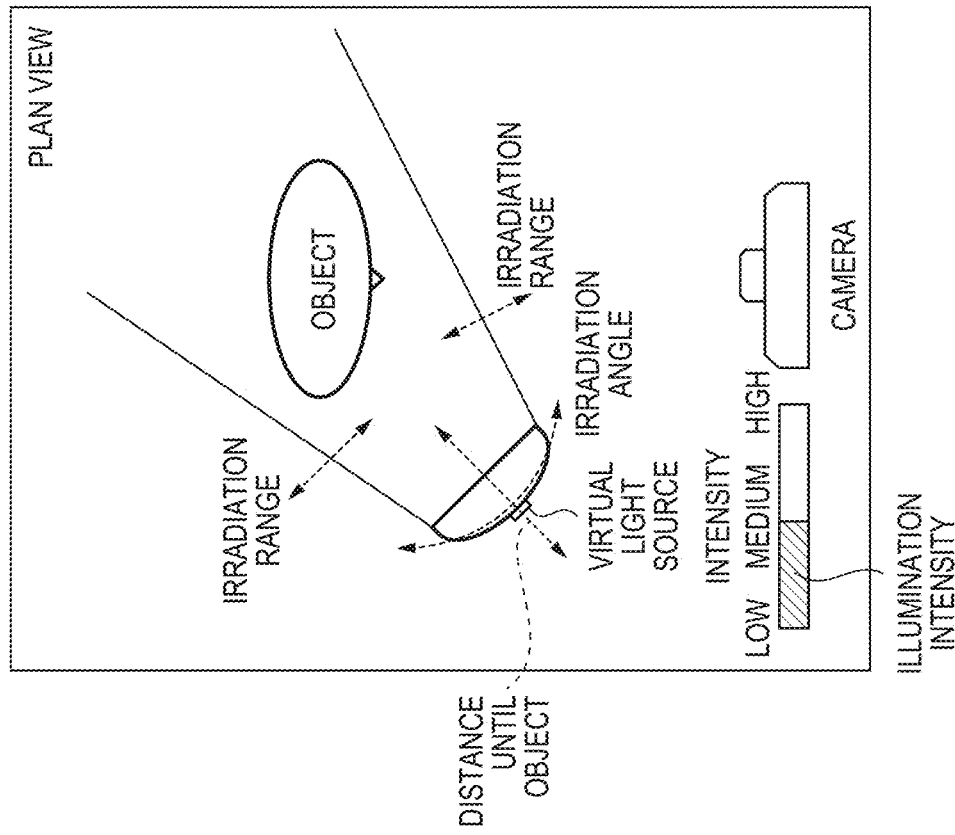
FIGS. 5A and 5B are diagrams illustrating parameter control of the virtual light source in the embodiment.
Figure 5B:
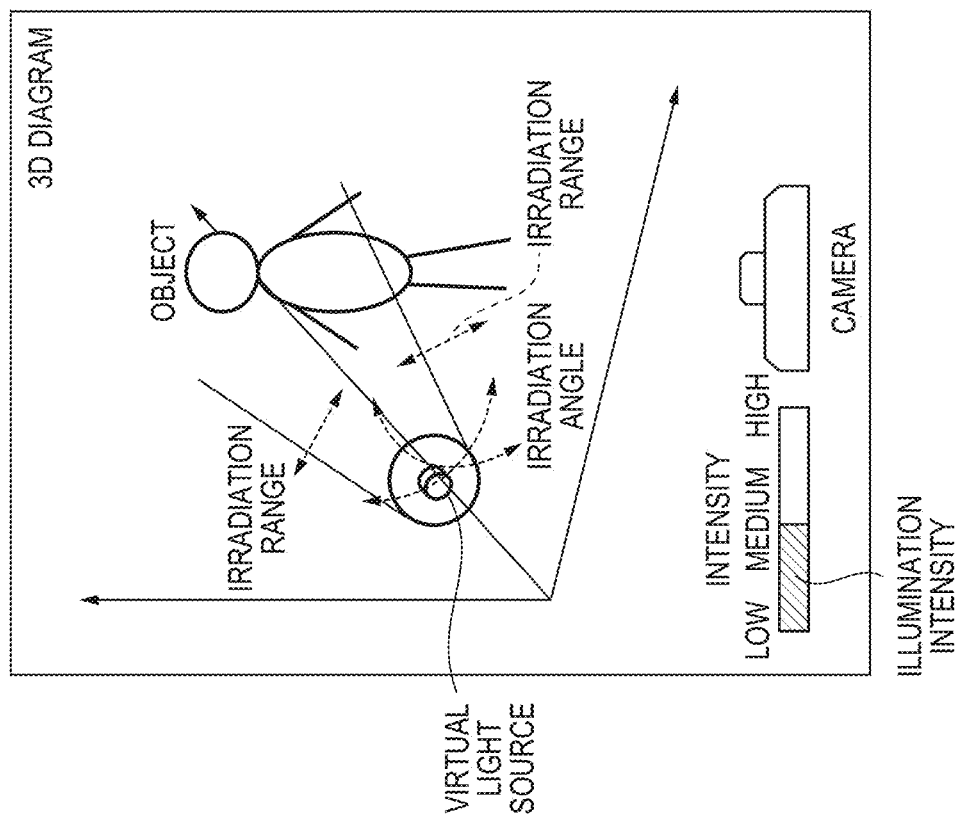

FIG. 5A is a perspective view illustrating a positional relationship between the object and the virtual light source, and FIG. 5B is a plan view illustrating a positional relationship between the object and the virtual light source. The position of the virtual light source is such that, if the distance between the virtual light source and an object is set to be short, light from the virtual light source is incident on the object with a high intensity, and, conversely, if the distance to an object is set to be long, light from the virtual light source is incident on the object with a low intensity. The irradiation range of the virtual light source is such that, if the irradiation range of the virtual light source is set to be wide, light is incident on the entire object, and, conversely, if the irradiation range is set to be narrow, light is incident only on part of the object. Furthermore, the intensity of the virtual light source is such that, if the intensity of the virtual light source is set to be high, light is incident on the object with a high intensity, and, conversely, if the intensity is set to be low, light is incident on the object with a low intensity.

The virtual light source reflection component calculating unit 307 calculates a component that is reflected by the object, out of light virtually emitted from the set virtual light source, based on a distance K between the light source and the object, the normal information N, and the parameters of the virtual light source set by the virtual light source setting unit 306. Hereinafter, the light virtually emitted from the set virtual light source is referred to as "virtual light". Specifically, a reflection component of virtual light at the portion of the object corresponding to a coordinate position in a captured image is calculated so as to be inversely proportional to a square of the distance K between the virtual light source and the portion of the object corresponding to each pixel and so as to be proportional to an inner product of the vector of the normal N and the vector of the light source direction L.

Hereinafter, a commonly used method for calculating a reflection component of virtual light will be described with reference to FIG. 4. Note that, although only the horizontal direction of the captured image is shown for the sake of description in FIG. 4, the direction that is vertical to the section of the diagram matches the vertical direction of the captured image as described above. In the description below, a method for calculating a reflection component of virtual light at a point P1 on the object 401, corresponding to a horizontal pixel position H1 and an unshown vertical pixel position V1 in the captured image, will be described.

In FIG. 4, a virtual light source 402 is a virtual light source set for the object 401. A reflection component of virtual light at a position (H1, V1) in an image captured by the camera 100 is proportional to an inner product of a normal vector N1 at the point P1 on the object 401 and a light source direction vector L1 of the virtual light source 402, and is inversely proportional to a square of a distance K1 between the virtual light source 402 and the point P1. Note that the normal vector N1 and the light source direction vector L1 are three-dimensional vectors each constituted by the horizontal direction, the vertical direction, and the depth direction (the direction indicated by the distance D in FIG. 4). This relationship can be expressed by a numerical formula as follows, that is, the reflection components (Ra, Ga, Ba) of virtual light at the point P1 on the object 401 are as expressed by the formula (1) below:

$$Ra = \alpha \times \{(-L1 \cdot N1)/K1^2\} \times Rt$$

$$Ga = \alpha \times \{(-L1 \cdot N1)/K1^2\} \times Gt$$

$$Ba = \alpha \times \{(-L1 \cdot N1)/K1^2\} \times Bt \qquad (1)$$

where $\alpha$ is the intensity of light from the virtual light source and is a gain value of a re-lighting correction amount, and Rt, Gt, and Bt are RGB signals output from the de-gamma processing unit 302.

The thus calculated reflection components (Ra, Ga, Ba) of virtual light are output to the virtual light source addition processing unit 308. The virtual light source addition processing unit 308 adds the reflection components (Ra, Ga, Ba) of virtual light to the RGB signals output from the de-gamma processing unit 302, through the processing expressed by the formula (2) below:

$$Rout = Rt + Ra$$

$$Gout = Gt + Ga$$

$$Bout = Bt + Ba \qquad (2)$$

The RBG signals (Rout, Gout, Bout) subjected to the re-lighting processing by the virtual light source addition processing unit 308 are input to a gamma processing unit 309 that performs gamma correction. Then, a luminance and chrominance signal generating unit 310 generates a luminance signal Y and chrominance signals R-Y and B-Y from the RGB signals (R'out, G'out, B'out) subjected to the gamma processing, and outputs the signals.

Figure 6A:
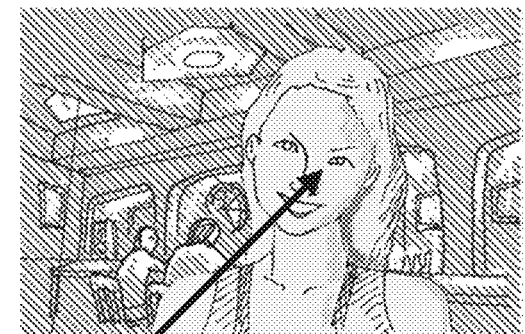
FIGS. 6A and 6B are diagrams showing an example of images before and after re-lighting processing in the embodiment.
Figure 6B:
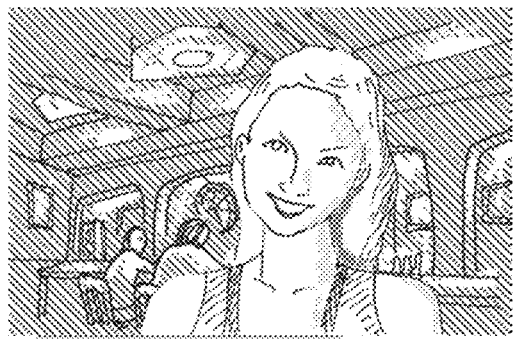

FIGS. 6A and 6B show an example in which the re-lighting processing unit 114 performs the above-described re-lighting processing. FIG. 6A shows an example of a captured image before re-lighting processing, and FIG. 6B shows an example of a captured image after re-lighting processing. A dark object as shown in FIG. 6A may be subjected to a re-lighting processing that applies virtual light (e.g. such as that described below with respect to FIG. 7), and thus the brightness thereof may be corrected to be increased as shown in FIG. 6B.

The system control unit 50 causes the memory control unit 107 to perform control so that the luminance signal Y and the chrominance signals R-Y and B-Y output by the re-lighting processing unit 114 are stored in the image memory 106, and then causes the codec unit 110 to compress and encode the signals. The signals are transmitted via the I/F 111 and stored in the storage medium 112.

Next, re-lighting processing by the re-lighting processing unit 114 in this embodiment will be described with reference to the flowchart in FIG. 7. This processing is performed on an image (the luminance signal Y and the chrominance signals R-Y and B-Y) processed by the image processing unit 105 and stored in the image memory 106, when the re-lighting processing is selected through an operation from the user by means of the operation unit 120.

In step S601, the system control unit 50 acquires a re-lighting processing mode selected through an operation from the user by means of the operation unit 120. In this embodiment, there are a mode in which parameters of the virtual light source are automatically decided on and a mode in which the user designates parameters of the virtual light source.

In step S602, the system control unit 50 determines whether or not the auto correction mode of the re-lighting processing acquired in step S601 is effective. If it is determined that the mode is effective, the procedure advances to step S603, otherwise, the procedure advances to step S605.

In step S603, the system control unit 50 causes the object region calculating unit 304 to calculate individual object regions for the number of objects, based on object information output from the object information detecting unit 208. For example, it is determined whether or not each pixel contains a person, using, as input, the total number N of people that are objects detected in an image and the position of each person that is an object, and generates an individual object region map corresponding to each object. Specifically, assuming that an individual object region map corresponding to an $n \in [1, 2, \ldots, N]^{-th}$ person is Dn, and values of the individual object region map at coordinates (x, y) are Dn (x, y), if there is an $n^{-th}$ person at coordinates (x1, y1), Dn (x1, y1)=1, otherwise, Dn (x1, y1)=0. The values taken by an object region map are not limited to binary values, and the map may also be a multi-value map indicating the probability of the presence of a person.

In step S604, the system control unit 50 causes the virtual light source setting unit 306 to calculate an individual virtual light source set value, based on object information output from the object information detecting unit 208. It is possible that shadow information of a face region of each object is acquired, and a position, an irradiation range, and an intensity of a virtual light source are calculated such that shadows of the face are reduced. The parameters of the virtual light source can be calculated using various known methods. Although a detailed description thereof has been omitted, for example, an orientation of environmental light is estimated from a bias of face luminance values and normal information of a face, and the position of the light source is decided on at a predetermined distance in the direction opposite to the environmental light. The parameters can be obtained by estimating the intensity of the light source such that the bias of the face luminance values is canceled, and calculating the irradiation range from the size of the face.

In step S605, the system control unit 50 determines whether or not the manual correction mode of the re-lighting processing acquired in step S601 is effective. If it is determined that the mode is effective, the procedure advances to step S606, otherwise, the procedure advances to step S609.

In step S606, the system control unit 50 acquires a main object selected through an operation (instruction) from the user by means of the operation unit 120.

In step S607, the system control unit 50 causes the object region calculating unit 304 to decide on a common object region, based on the main object acquired in step S606, the object information output from the object information detecting unit 208, and the distance information output from the distance calculating unit 303. For example, regions that are within a predetermined distance range (within a range) with respect to the distance value of the main object are taken as common object regions. Assuming that a common object region map is Dc, and values of the common object region map at coordinates (x, y) are Dc (x, y), if the distance of the coordinates (x, y) is within a predetermined distance range with respect to the distance value of the main object, Dc (x, y)=1, otherwise, Dc (x, y)=0. It is sufficient that the values of the common object region map are calculated as 1 when the distance from the main object is 0, and monotonically decrease in accordance with an increase in the distance from the main object, and the values of the common object region map are not limited to those according to the above-described calculation method.

In step S608, the system control unit 50 acquires a virtual light source set value common to the objects, based on a user's operation. Specifically, the position, the intensity, and the irradiation range of the light source are acquired through an operation from the user by means of the operation unit 120.

In step S609, the system control unit 50 causes the virtual light source reflection component calculating unit 307 to calculate reflection components (Ra, Ga, Ba) of the virtual light, based on the normal information output from the normal calculating unit 305, the individual object region calculated in step S603, the individual light source set value calculated in step S604, the common object region calculated in step S607, and the common light source set value calculated in step S608.

First, reflective light components (R1, G1, B1), (R2, G2, B2), . . . (RN, GN, BN) are calculated according to the formula (1) above from the N light source set values calculated in step S604. Next, reflection components (Rc, Gc, Bc) are calculated according to the formula (1) above from the common light source set value calculated in step S608. Next, a reflection component obtained by compositing the reflection components is calculated. If an individual object region contains the coordinates (x, y), a virtual light source component of a light source corresponding thereto is applied, and, if a common object region contains the coordinates, a common virtual light source component is applied. If two or more virtual light sources are applied, ultimate reflection components (Ra, Ga, Ba) are the sum of all reflection components of virtual light, and are calculated by the formula (3) below:

$$R_a(x, y) = \sum_{n=1}^{N} R_n(x, y)D_n(x, y) + R_c(x, y)$$

$$G_a(x, y) = \sum_{n=1}^{N} G_n(x, y)D_n(x, y) + G_c(x, y)$$

$$B_a(x, y) = \sum_{n=1}^{N} B_n(x, y)D_n(x, y) + B_c(x, y)$$

(3)

Note that the method for compositing light sources is not limited to that expressed by the formula above, and it is also possible that reflective light components are compared with each other as shown in the formula (4) below, and only the largest light source setting is used for calculation.

$$Ra(x,y)=\max(R1(x,y)D1(x,y), \ldots ,RN(x,y)DN(x,y),Rc(x,y)Dc(x,y))$$

$$Ga(x,y)=\max(G1(x,y)D1(x,y), \ldots ,GN(x,y)DN(x,y),Gc(x,y)Dc(x,y))$$

$$Ba(x,y)=\max(B1(x,y)D1(x,y), \ldots ,BN(x,y)DN(x,y),Bc(x,y)Dc(x,y))$$

(4)

There are cases in which virtual light source component parameters are not calculated depending on the mode during development, and, in such a case, the virtual light source components are set to 0.

In step S610, the system control unit 50 adds a virtual light source. The virtual light source addition processing unit 308 adds the reflection components (Ra, Ga, Ba) of the virtual light source to the output (Rt, Gt, Bt) of the de-gamma processing unit as expressed by the formula (2) above. After the re-lighting processing is ended, the processing by the re-lighting processing unit 114 is ended.

As described above, according to the foregoing embodiment, it is possible to provide an image with a lighting effect as desired by a user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-072924, filed Apr. 15, 2020 which is hereby incorporated by reference herein in its entirety.

What is claimed is:

1. An image processing apparatus comprising:
at least one processor or circuit configured to function as
a processing unit configured to provide an image containing a first object and a second object, with an effect of a virtual light from a virtual light source;
a setting unit configured to set a parameter of the virtual light source; and a designating unit configured to designate the first object and/or the second object, as a target of the processing unit, based on a user's operation, wherein, in a case in which the designating unit has designated at least one of the first object and the second object, the first object and the second object are provided with an effect of virtual light from a same direction, and in a case in which the designating unit has not designated any object, the first object and the second object are provided with an effect of virtual light from different directions.

2. The image processing apparatus according to claim 1, wherein the setting unit has a manual correction mode in which the designating unit designates at least one of the first object and the second object and an auto correction mode in which the designating unit does not designate the first object or the second object.

3. The image processing apparatus according to claim 2, wherein, in the auto correction mode, the setting unit sets a parameter of the virtual light source so as to reduce shadows based on shadow information of an object.

4. The image processing apparatus according to claim 3, wherein the setting unit determines shadows of an object based on an average luminance or a luminance histogram of the object.

5. The image processing apparatus according to claim 2, wherein, in the manual correction mode, the setting unit sets a parameter of the virtual light source based on a user's instruction.

6. The image processing apparatus according to claim 2, wherein, in a region in which components of virtual light sources are added in a duplicated manner, the processing unit compares the components of the respective virtual light sources and adds a largest component.

7. The image processing apparatus according to claim 1, wherein, in a case in which the designating unit has designated at least one of the first object and the second object, the setting unit sets the same direction based on information on the designated object.

8. The image processing apparatus according to claim 7, wherein the object designated by the designating unit is a main object decided on based on a user's instruction and an object whose distance from the main object is within a predetermined range.

9. The image processing apparatus according to claim 1, wherein the virtual light source includes at least one of additive light that increases thea brightness of an object, subtractive light that decreases the brightness of an object, and mirror-reflective light that adds mirror reflection to an object.

10. The image processing apparatus according to claim 1, wherein the parameter of the virtual light source includes at least one of a position, an irradiation range, an orientation, and an intensity of the virtual light source.

11. An image processing method comprising:
providing an image containing a first object and a second object, with an effect of a virtual light from a virtual light source;
setting a parameter of the virtual light source; and
performing a selection process, in which the first object and/or the second object may be designated, as a target of the processing, based on a user's operation,
wherein, in a case in which at least one of the first object and the second object has been designated in the selection process, the first object and the second object are provided with an effect of virtual light from a same direction, and
in a case in which no object has been designated in the designating, the first object and the second object are provided with an effect of virtual light from different directions.

12. A non-transitory computer-readable storage medium storing a program for causing a computer to execute the steps of an image processing method, the method comprising:
providing an image containing a first object and a second object, with an effect of a virtual light from a virtual light source;
setting a parameter of the virtual light source; and
performing a selection process, in which the first object and/or the second object may be designated, as a target of the processing, based on a user's operation,
wherein, in a case in which at least one of the first object and the second object has been designated in the selection process, the first object and the second object are provided with an effect of virtual light from a same direction, and
in a case in which no object has been designated in the designating, the first object and the second object are provided with an effect of virtual light from different directions.

13. An image processing apparatus comprising:
at least one processor or circuit configured to function as
a processing unit configured to provide a plurality of objects in an image, with an effect of a virtual light from a virtual light source;
a setting unit configured to set a parameter of the virtual light source; and
a designating unit configured to designate any of the plurality of objects, as a target of the processing unit, based on a user's operation,
wherein, in a case in which the designating unit has designated any object, the setting unit sets a parameter of the virtual light source for an object that is not designated by the designating unit, based on a parameter of the virtual light source for the designated object, and
in a case in which the designating unit has not designated any object, the setting unit sets a parameter of the virtual light source for each of the plurality of objects, based on information regarding the object.

14. An image processing method comprising:
providing a plurality of objects in an image, with an effect of a virtual light from a virtual light source;
setting a parameter of the virtual light source; and
performing a selection process, in which any of the plurality of objects may be designated, as a target of the processing, based on a user's operation,
wherein, in a case in which any object has been designated in the designating, a parameter of the virtual light source is set in the setting for an object that is not designated in the designating, based on a parameter of the virtual light source for the designated object, and
in a case in which no object has been designated in the designating, a parameter of the virtual light source is set in the setting for each of the plurality of objects, based on information regarding the object.

15. A non-transitory computer-readable storage medium storing a program for causing a computer to execute the steps of the image processing method, the method comprising:

providing a plurality of objects in an image, with an effect of a virtual light from a virtual light source;
setting a parameter of the virtual light source; and
performing a selection process, in which any of the plurality of objects may be designated, as a target of the processing, based on a user's operation,
wherein, in a case in which any object has been designated in the designating, a parameter of the virtual light source is set in the setting for an object that is not designated in the designating, based on a parameter of the virtual light source for the designated object, and
in a case in which no object has been designated in the designating, a parameter of the virtual light source is set in the setting for each of the plurality of objects, based on information regarding the object.

* * * * *